US010321464B2

(12) United States Patent
Wen et al.

(10) Patent No.: US 10,321,464 B2
(45) Date of Patent: Jun. 11, 2019

(54) MANAGEMENT METHOD AND APPARATUS FOR SUPPORTING MULTIPLE SIM CARDS TO SHARE RF PROCESSOR

(71) Applicant: HUAWEI TECHNOLOGIES CO., LTD., Shenzhen (CN)

(72) Inventors: Hui Wen, Beijing (CN); Ning Dong, Beijing (CN); Ning Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/878,419

(22) Filed: Jan. 24, 2018

(65) Prior Publication Data

US 2018/0152937 A1 May 31, 2018

Related U.S. Application Data

(63) Continuation of application No. PCT/CN2016/083020, filed on May 23, 2016.

(30) Foreign Application Priority Data

Sep. 18, 2015 (CN) .......................... 2015 1 0598490

(51) Int. Cl.
*H04W 72/04* (2009.01)
*H04W 88/06* (2009.01)
(Continued)

(52) U.S. Cl.
CPC ........... *H04W 72/048* (2013.01); *H04W 8/18* (2013.01); *H04W 72/0446* (2013.01);
(Continued)

(58) Field of Classification Search
CPC . H04W 72/048; H04W 8/18; H04W 72/0446; H04W 88/06; H04W 72/10; H04W 12/08; H04W 76/30
See application file for complete search history.

(56) References Cited

U.S. PATENT DOCUMENTS

| | | | |
|---|---|---|---|
| 10,027,359 B2* | 7/2018 | Krishnamoorthi | .. H04W 72/042 |
| 2008/0120450 A1* | 5/2008 | Mott | ...................... G06F 13/364 710/113 |

(Continued)

FOREIGN PATENT DOCUMENTS

| | | |
|---|---|---|
| CN | 102065579 A | 5/2011 |
| CN | 103428673 A | 12/2013 |

(Continued)

OTHER PUBLICATIONS

Wikipedia "Preemption (computing)" Sep. 16, 2015, XP055466673, 3 pages.

(Continued)

*Primary Examiner* — Marcos L Torres
(74) *Attorney, Agent, or Firm* — Kilpatrick Townsend & Stockton LLP

(57) ABSTRACT

A management method and apparatus for supporting multiple SIM cards to share an RF processor. The method includes: after receiving a resource request sent by a first baseband communications processor, determining whether the RF processor is authorized be used by a second baseband communications processor in at least a part of a time period required for using the RF processor by the first baseband communications processor; if yes, comparing whether a priority of a type of a first communications service that needs to be performed by the first baseband communications processor is higher than a priority of a type of a second communications service performed by the second baseband communications processor; and if yes, sending an authori- (Continued)

zation message to the first baseband communications processor and instructing the second baseband communications processor to stop performing the second communications service.

16 Claims, 11 Drawing Sheets

(51) Int. Cl.
H04W 8/18 (2009.01)
H04W 76/30 (2018.01)
H04W 12/08 (2009.01)
H04W 72/10 (2009.01)

(52) U.S. Cl.
CPC ............ *H04W 88/06* (2013.01); *H04W 12/08* (2013.01); *H04W 72/10* (2013.01); *H04W 76/30* (2018.02)

(56) References Cited

U.S. PATENT DOCUMENTS

| | | |
|---|---|---|
| 2011/0117965 A1 | 5/2011 | Gong et al. |
| 2011/0280166 A1 | 11/2011 | Nien et al. |
| 2012/0327790 A1 | 12/2012 | Lee et al. |
| 2013/0044609 A1 | 2/2013 | Chen et al. |
| 2013/0142088 A1 | 6/2013 | Li et al. |
| 2013/0316718 A1* | 11/2013 | Hsu .................. H04W 72/1278 455/450 |
| 2014/0220981 A1 | 8/2014 | Jheng et al. |
| 2015/0282057 A1* | 10/2015 | Li ....................... H04B 7/0871 455/552.1 |
| 2017/0374544 A1* | 12/2017 | Lipka .................. H04W 8/183 |

FOREIGN PATENT DOCUMENTS

| | | |
|---|---|---|
| CN | 104113937 A | 10/2014 |
| CN | 104144406 A | 11/2014 |
| CN | 104684023 A | 6/2015 |
| CN | 105306681 A | 2/2016 |

OTHER PUBLICATIONS

3GPP TS 23.203 V13.5.0 3rd Generation Partnership Project;Technical Specification Group Services and System Aspects;Policy and charging control architecture(Release 13), Technical Specification, Sep. 2015, 243 pages.

* cited by examiner

MANAGEMENT METHOD AND APPARATUS FOR SUPPORTING MULTIPLE SIM CARDS TO SHARE RF PROCESSOR

CROSS-REFERENCE TO RELATED APPLICATION

This application is a continuation of International Application No. PCT/CN2016/083020, filed on May 23, 2016, which claims priority to Chinese Patent Application No. 201510598490.4, filed on Sep. 18, 2015, both of which are hereby incorporated by reference in their entireties.

TECHNICAL FIELD

The present invention relates to the field of wireless communications technologies, and specifically, to a management method and apparatus for supporting multiple SIM cards to share an RF processor.

BACKGROUND

A dual card dual standby terminal refers to a terminal that is provided with a dual SIM slot and that can support two subscriber identity module (SIM) cards or two universal subscriber identity module (USIM) cards to be in standby and to perform a voice or data service in two network standards. Currently, to effectively reduce power consumption, production costs, and an area of an internal chip of the dual card dual standby terminal, a radio frequency (RF) channel sharing solution, that is, two cards sharing one RF processor, is proposed, for example, a G (GSM, Global System for Mobile Communications)+G mode RF channel sharing solution or a W (WCDMA, Wideband Code Division Multiple Access)+G mode RF channel sharing solution.

A principle of a current RF channel sharing solution is: When there is a communications service on one card, a baseband communications processor of the card applies to a transceiver resource management (TRM) module for a permission to use an RF processor and notifies the TRM module of a time period for using the RF processor. If a baseband communications processor of the other card is not authorized to use the RF processor in the time period, the TRM module authorizes the baseband communications processor of the card, on which there is the communications service, to use the RF processor to perform the communications service in the time period. On the contrary, if the baseband communications processor of the other card is authorized to use the RF processor in a part or the entire of the time period, the TRM module notifies the card, on which there is a communications service, of a failure in applying for the permission to use the RF processor. That is, only when the RF processor is in an idle state, the permission to use the RF processor can be authorized to process a new communications service. It can be learned that the current RF channel sharing solution has a problem of improper allocation of a permission to use an RF processor.

SUMMARY

Embodiments of the present invention disclose a management method and apparatus for supporting multiple SIM cards to share an radio frequency (RF) processor, so as to properly allocate a permission to use an RF processor according to a priority of a type of a communications service.

A first aspect of the embodiments of the present invention discloses a management method for supporting multiple SIM cards to share an RF processor, where the method includes:

receiving a resource request sent by a first baseband communications processor, where the first baseband communications processor is configured to implement a first communications service on a first SIM card, the resource request is used to request, in response to the first communications service, a permission to use the RF processor, and the resource request includes a type of the first communications service and a time period required for using the RF processor;

determining whether the RF processor is authorized to perform a second communications service on a second SIM card for a second baseband communications processor in at least a part of the time period;

when the RF processor is authorized to perform the second communications service for the second baseband communications processor in at least the part of the time period, comparing whether a priority of the type of the first communications service is higher than a priority of a type of the second communications service; and when the priority of the type of the first communications service is higher than the priority of the type of the second communications service, sending a first authorization message to the first baseband communications processor and instructing the second baseband communications processor to stop performing the second communications service, where the first authorization message is used to authorize the first baseband communications processor to use the RF processor to perform the first communications service.

In a first possible implementation manner of the first aspect of the embodiments of the present invention, the resource request is sent from a physical layer of the first baseband communications processor.

With reference to the first aspect of the embodiments of the present invention, in a second possible implementation manner of the first aspect of the embodiments of the present invention, the resource request is sent from a radio resource control (RRC) layer of the first baseband communications processor; and the sending a first authorization message to the first baseband communications processor includes:

sending the first authorization message to a radio control and management RCM module, to enable the RCM module to send the first authorization message to the first baseband communications processor.

With reference to the first aspect of the embodiments of the present invention, the first possible implementation manner of the first aspect of the embodiments of the present invention, or the second possible implementation manner of the first aspect of the embodiments of the present invention, in a third possible implementation manner of the first aspect of the embodiments of the present invention, the comparing whether a priority of the type of the first communications service is higher than a priority of a type of the second communications service includes:

determining whether the second communications service is pre-emptible; and when the second communications service is pre-emptible, comparing whether the priority of the type of the first communications service is higher than the priority of the type of the second communications service.

With reference to the first aspect of the embodiments of the present invention, the first possible implementation manner of the first aspect of the embodiments of the present invention, the second possible implementation manner of the first aspect of the embodiments of the present invention, or the third possible implementation manner of the first aspect of the embodiments of the present invention, in a fourth possible implementation manner of the first aspect of the embodiments of the present invention, the method further includes:

when the priority of the type of the first communications service is lower than or equal to the priority of the type of the second communications service, sending a resource request failure message to the first baseband communications processor, where the resource request failure message indicates that the first baseband communications processor is not authorized to use the RF processor to perform the first communications service.

With reference to the first aspect of the embodiments of the present invention, the first possible implementation manner of the first aspect of the embodiments of the present invention, the second possible implementation manner of the first aspect of the embodiments of the present invention, the third possible implementation manner of the first aspect of the embodiments of the present invention, or the fourth possible implementation manner of the first aspect of the embodiments of the present invention, in a fifth possible implementation manner of the first aspect of the embodiments of the present invention, after the sending a first authorization message to the first baseband communications processor and instructing the second baseband communications processor to stop performing the second communications service, the method further includes:

receiving a resource release indication message sent by the first baseband communications processor, where the resource release indication message indicates that the permission to use the RF processor has been released by the first baseband communications processor; and sending a second authorization message to the second baseband communications processor according to the resource release indication message, where the second authorization message is used to authorize the second baseband communications processor to continue to use the RF processor to perform the second communications service.

With reference to the first aspect of the embodiments of the present invention, the first possible implementation manner of the first aspect of the embodiments of the present invention, the second possible implementation manner of the first aspect of the embodiments of the present invention, the third possible implementation manner of the first aspect of the embodiments of the present invention, the fourth possible implementation manner of the first aspect of the embodiments of the present invention, or the fifth possible implementation manner of the first aspect of the embodiments of the present invention, in a sixth possible implementation manner of the first aspect of the embodiments of the present invention, the resource request further includes a preemption attribute of the first communications service, and the preemption attribute indicates whether the first communications service is pre-emptible.

With reference to the first aspect of the embodiments of the present invention, the first possible implementation manner of the first aspect of the embodiments of the present invention, the second possible implementation manner of the first aspect of the embodiments of the present invention, the third possible implementation manner of the first aspect of the embodiments of the present invention, the fourth possible implementation manner of the first aspect of the embodiments of the present invention, the fifth possible implementation manner of the first aspect of the embodiments of the present invention, or the sixth possible implementation manner of the first aspect of the embodiments of the present invention, in a seventh possible implementation manner of the first aspect of the embodiments of the present invention, the first SIM card supports at least one communications network standard, and the second SIM card supports at least one communications network standard.

A second aspect of the embodiments of the present invention discloses a management apparatus for supporting multiple SIM cards to share an RF processor, where the apparatus includes the RF processor, a first baseband communications processor, a second baseband communications processor, and a manager, where the first baseband communications processor is configured to send a resource request to the manager when there is a first communications service that needs to be performed on a first SIM card, where the resource request is used to request, in response to the first communications service, a permission to use the RF processor, and the resource request includes a type of the first communications service and a time period required for using the RF processor;

the second baseband communications processor is configured to implement a second communications service on a second SIM card;

the manager is configured to: receive the resource request; determine whether the RF processor is authorized for the second baseband communications processor to perform the second communications service in at least a part of the time period; when it is determined that the RF processor is authorized for the second baseband communications processor to perform the second communications service in at least a part of the time period, compare whether a priority of the type of the first communications service is higher than a priority of a type of the second communications service; and when the priority of the type of the first communications service is higher than the priority of the type of the second communications service, send a first authorization message to the first baseband communications processor, couple the first baseband communications processor to the RF processor, and instruct the second baseband communications processor to stop performing the second communications service, where the first authorization message is used to authorize the first baseband communications processor to use the RF processor to perform the first communications service; and the RF processor is configured to provide an RF communications link for the first communications service when the first baseband communications processor is authorized to use the RF processor.

In a first possible implementation manner of the second aspect of the embodiments of the present invention, the first baseband communications processor includes an RRC module and a physical layer management module, the resource request is sent by the physical layer management module, and the manager includes an RCM module, where the RRC module is configured to: implement processing of a radio resource control communications protocol for the first SIM card, and send, to the physical layer management module when there is the first communications service on the first SIM card, a first notification message used to indicate that there is the first communications service on the first SIM card;

the physical layer management module is configured to: implement processing of a physical layer communications protocol for the first SIM card, receive the first notification message, and send the resource request to the RCM module; and the RCM module is configured to: receive the resource request; determine whether the RF processor is authorized for the second baseband communications processor to perform the second communications service in at least the part of the time period; when the result of the determination is yes, compare whether the priority of the type of the first communications service is higher than the priority of the type of the second communications service; and when the priority of the type of the first communications service is higher than the priority of the type of the second communications service, send the first authorization message to the first baseband communications processor, couple the first baseband communications processor to the RF processor, and instruct the second baseband communications processor to stop performing the second communications service.

With reference to the second aspect of the embodiments of the present invention, in a second possible implementation manner of the second aspect of the embodiments of the present invention, the first baseband communications processor includes an RRC module and a physical layer management module, the resource request is sent by the RRC module, and the manager includes a radio resource management RRM module and an RCM module, where the RRC module is configured to: implement processing of a radio resource control communications protocol for the first SIM card, and send the resource request to the RRM module when there is the first communications service on the first SIM card;

the physical layer management module is configured to implement processing of a physical layer communications protocol for the first SIM card;

the RRM module is configured to: receive the resource request; determine whether the RF processor is authorized for the second baseband communications processor to perform the second communications service in at least the part of the time period; when the result of the determination is yes, compare whether the priority of the type of the first communications service is higher than the priority of the type of the second communications service; and when the priority of the type of the first communications service is higher than the priority of the type of the second communications service, send the first authorization message to the RCM module; and the RCM module is configured to: receive the first authorization message sent by the RRM module, send the first authorization message to the first baseband communications processor, couple the first baseband communications processor to the RF processor, and instruct the second baseband communications processor to stop performing the second communications service.

With reference to the second aspect of the embodiments of the present invention, the first possible implementation manner of the second aspect of the embodiments of the present invention, or the second possible implementation manner of the second aspect of the embodiments of the present invention, in a third possible implementation manner of the second aspect of the embodiments of the present invention, a specific manner in which the manager compares whether the priority of the type of the first communications service is higher than the priority of the type of the second communications service is:

determining whether the second communications service is pre-emptible; and when the second communications service is pre-emptible, comparing whether the priority of the type of the first communications service is higher than the priority of the type of the second communications service.

With reference to the second aspect of the embodiments of the present invention, the first possible implementation manner of the second aspect of the embodiments of the present invention, the second possible implementation manner of the second aspect of the embodiments of the present invention, or the third possible implementation manner of the second aspect of the embodiments of the present invention, in a fourth possible implementation manner of the second aspect of the embodiments of the present invention, the manager is further configured to send a resource request failure message to the first baseband communications processor when the priority of the type of the first communications service is lower than or equal to the priority of the type of the second communications service, where the resource request failure message indicates that the first baseband communications processor is not authorized to use the RF processor to perform the first communications service.

With reference to the second aspect of the embodiments of the present invention, the first possible implementation manner of the second aspect of the embodiments of the present invention, the second possible implementation manner of the second aspect of the embodiments of the present invention, the third possible implementation manner of the second aspect of the embodiments of the present invention, or the fourth possible implementation manner of the second aspect of the embodiments of the present invention, in a fifth possible implementation manner of the second aspect of the embodiments of the present invention, the manager is further configured to: receive a resource release indication message sent by the first baseband communications processor, and send a second authorization message to the second baseband communications processor according to the resource release indication message, where the resource release indication message indicates that the permission to use the RF processor has been released by the first baseband communications processor, and the second authorization message is used to authorize the second baseband communications processor to continue to use the RF processor to perform the second communications service.

With reference to the second aspect of the embodiments of the present invention, the first possible implementation manner of the second aspect of the embodiments of the present invention, the second possible implementation manner of the second aspect of the embodiments of the present invention, the third possible implementation manner of the second aspect of the embodiments of the present invention, the fourth possible implementation manner of the second aspect of the embodiments of the present invention, or the fifth possible implementation manner of the second aspect of the embodiments of the present invention, in a sixth possible implementation manner of the second aspect of the embodiments of the present invention, the resource request further includes a preemption attribute of the first communications service, and the preemption attribute indicates whether the first communications service is pre-emptible.

With reference to the second aspect of the embodiments of the present invention, the first possible implementation manner of the second aspect of the embodiments of the present invention, the second possible implementation manner of the second aspect of the embodiments of the present invention, the third possible implementation manner of the second aspect of the embodiments of the present invention, the fourth possible implementation manner of the second aspect of the embodiments of the present invention, the fifth possible implementation manner of the second aspect of the embodiments of the present invention, or the sixth possible implementation manner of the second aspect of the embodiments of the present invention, in a seventh possible implementation manner of the second aspect of the embodiments of the present invention, the first SIM card supports at least one communications network standard, and the second SIM card supports at least one communications network standard.

In the embodiments of the present invention, after a resource request sent by a first baseband communications processor is received, whether an RF processor is authorized for a second baseband communications processor to use in at least a part of a time period required for using the RF processor by the first baseband communications processor is determined; if yes, whether a priority of a type of a first communications service that needs to be performed by the first baseband communications processor is higher than a priority of a type of a second communications service performed by the second baseband communications processor is compared; and if yes, an authorization message is sent to the first baseband communications processor and the second baseband communications processor is instructed to stop performing the second communications service. It can be learned that in the embodiments of the present invention, a permission to use an RF processor can be properly allocated for different communications services according to priorities of types of communications services on different SIM cards.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without undue experiment shall fall within the protection scope of the present invention.

The embodiments of the present invention disclose a management method and apparatus for supporting multiple SIM cards to share an RF processor, so as to properly allocate, according to a priority of a type of a communications service, a permission to use an RF processor. Detailed descriptions are provided below separately.

Figure 1:
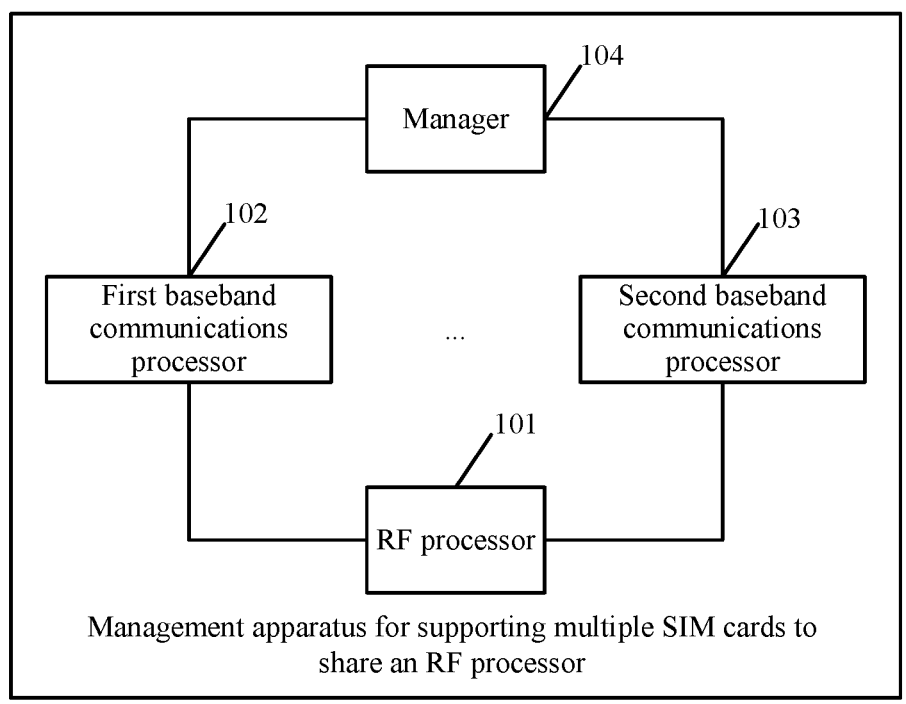
FIG. 1 is a schematic structural diagram of a management apparatus for supporting multiple SIM cards to share an RF processor according to an embodiment of the present invention.

Referring to FIG. 1, FIG. 1 is a schematic structural diagram of a management apparatus for supporting multiple SIM cards to share an RF processor according to an embodiment of the present invention, that is, the apparatus supports multi-card multi-standby. Subsequently, this embodiment of the present invention is described by mainly using a dual card dual standby application scenario as an example, which is not intended to limit the present invention. The apparatus shown in FIG. 1 can be applied to a mobile terminal which can support multiple SIM cards, for example, in a mobile phone or a tablet computer. As shown in FIG. 1, the apparatus may include an RF processor 101, at least one first baseband communications processor 102, at least one second baseband communications processor 103, and a manager 104. The first baseband communications processor 102 implements a communications service on a first SIM card when the first baseband communications processor 102 applied for a permission to use the RF processor 101 and the second baseband communications processor 103 implements a communications service on a second SIM card when the second baseband communications processor 103 applied for the permission to use the RF processor 101.

The first baseband communications processor 102 is configured to send a resource request to the manager 104 when there is a first communications service that needs to be performed on the first SIM card.

The resource request is used to request, in response to the first communications service on the first SIM card, the permission to use the RF processor 101, and the resource request may include a type of the first communications service on the first SIM card and a time period required for using the RF processor 101.

The second baseband communications processor 103 is configured to implement a second communications service on the second SIM card.

The manager 104 is configured to: receive the resource request sent by the first baseband communications processor 102; determine whether the RF processor 101 is authorized for the second baseband communications processor 103 in at least a part of the time period to perform the second communications service; when it is determined that the RF processor is authorized for the second baseband communications processor to perform the second communications service in at least a part of the time period, compare whether a priority of the type of the first communications service is higher than a priority of a type of the second communications service; and when the priority of the type of the first communications service is higher than the priority of the type of the second communications service, send a first authorization message to the first baseband communications processor 102, couple the first baseband communications processor 102 to the RF processor 101, and instruct the second baseband communications processor 103 to stop performing the second communications service. The first authorization message is used to authorize the first baseband communications processor 102 to use the RF processor 101 to perform the first communications service.

The RF processor 101 is configured to provide an RF communications link for the first communications service when the first baseband communications processor 102 is authorized to use the RF processor 101.

In this embodiment of the present invention, the type of the first communications service and the type of the second communications service may be determined according to a quality of service class identifier (QCI) of a communications service. Moreover, after the manager 104 determines the type of the first communications service and the type of the second communications service, the priority of the type of the first communications service and the priority of the type of the second communications service may be determined separately according to a standard QCI attribute listed in the following Table 1.

In this embodiment of the present invention, when the manager 104 determines that the RF processor 101 is not authorized for another first baseband communications processor 102 than the first baseband communications processor 102, and for all second baseband communications processor 103 to use in the time period, the manager 104 may directly send the first authorization message to the first baseband communications processor 102.

Figure 2:
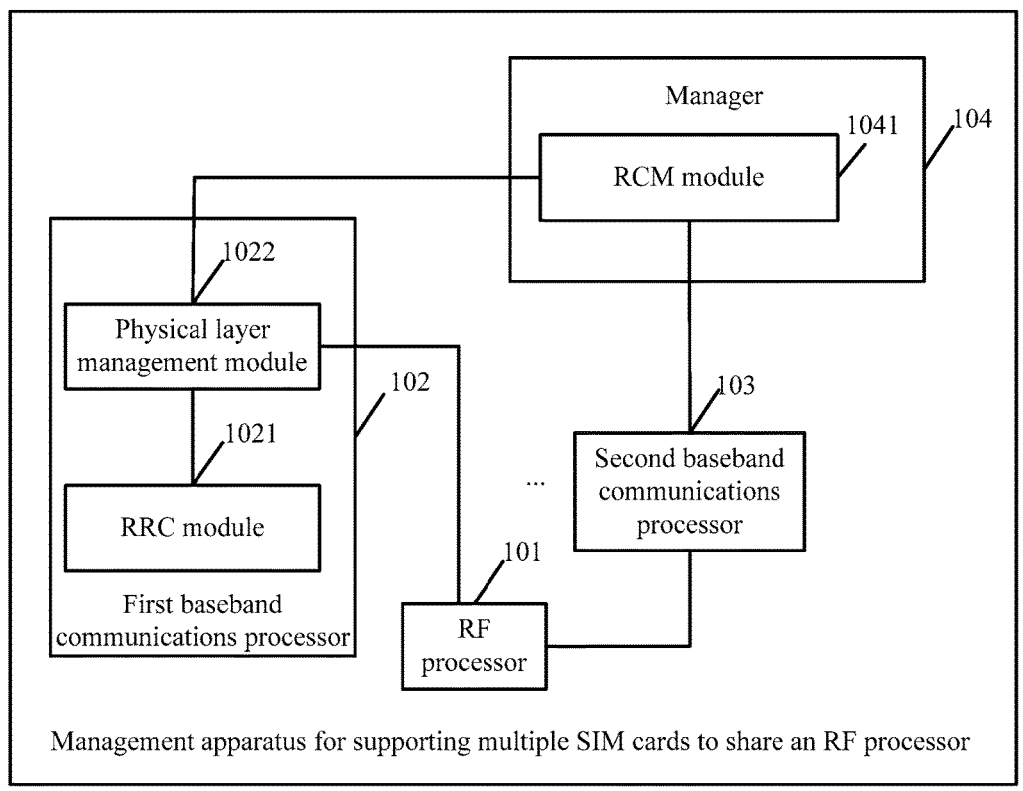
FIG. 2 is a schematic structural diagram of another management apparatus for supporting multiple SIM cards to share an RF processor according to an embodiment of the present invention.

In an optional embodiment, the first baseband communications processor 102 may include a radio resource control (RRC) module 1021 and a physical layer management module 1022, and the manager 104 may include a radio control and management (RCM) module 1041. In this case, a structure of the management apparatus for supporting multiple SIM cards to share an RF processor may be shown in FIG. 2. FIG. 2 is a schematic structural diagram of another management apparatus for supporting multiple SIM cards to share an RF processor according to an embodiment of the present invention. The RRC module 1021 is responsible for management of an RRC layer of the first baseband communications processor 102, and is mainly responsible for selecting and reselecting a cell when the first baseband communications processor 102 does not have a service requirement for a communications service, and for establishing a wireless link when the first baseband communications processor 102 has a service requirement for a communications service, until execution of the communications service is complete. The physical layer management module 1022 is responsible for management of a physical layer of the first baseband communications processor 102, and is mainly responsible for uplink and downlink synchronization, for maintenance of an unblocked wireless link, and for processing and reception/transmission of communications data. A difference between the RRC module 1021 and the

TABLE 1

Standard QCI attributes

| QCI | Resource type | Resource priority | Data delay | Packet loss rate of data | Service example |
|-----|---------------|-------------------|------------|--------------------------|-----------------|
| 1 | Guaranteed bit rate type | 2 | 100 ms | $10^{-2}$ | Voice session |
| 2 | | 4 | 150 ms | $10^{-3}$ | Video session (a real-time streaming service) |
| 3 | | 3 | 50 ms | $10^{-3}$ | Real-time gaming |
| 4 | | 5 | 300 ms | $10^{-6}$ | Non-video session (a buffered streaming service) |
| 5 | Non-guaranteed bit rate type | 1 | 100 ms | $10^{-6}$ | IMS signaling |
| 6 | | 6 | 300 ms | $10^{-6}$ | Video (a buffered streaming service), TCP-based service (for example, www, an e-mail, chatting, an FTP service, P2P file sharing, and a progressive scan video) |
| 7 | | 7 | 100 ms | $10^{-3}$ | Voice, video (a real-time streaming service), and an interactive gaming service |
| 8 | | 8 | 300 ms | $10^{-6}$ | Video (a buffered streaming service), TCP-based service (for example, www, an e-mail, chatting, an FTP service, P2P file sharing, and a progressive scan video) |
| 9 | | 9 | 300 ms | $10^{-6}$ | | physical layer management module 1022 is: The RRC module 1021 belongs to layer 2 or a higher layer of a protocol stack and needs to use a wireless link, while the physical layer management module 1022 belongs to layer 1 of the protocol stack and actually carries the wireless link.

The RRC module 1021 is configured to: implement processing of a radio resource control communications protocol for the first SIM card, and send, to the physical layer management module 1022 when there is the first communications service on the first SIM card, a first notification message used to indicate that there is the first communications service on the first SIM card.

The physical layer management module 1022 is configured to: receive the first notification message sent by the RRC module 1021, and send the resource request to the RCM module 1041 of the manager 104 according to the first notification message.

The RCM module 1041 is configured to: receive the resource request sent by the physical layer management module 1022; determine whether the RF processor 101 is authorized for the second baseband communications processor 103 to perform the second communications service in at least the part of the time period; when the result of the determination is yes, compare whether the priority of the type of the first communications service is higher than the priority of the type of the second communications service; and when the priority of the type of the first communications service is higher than the priority of the type of the second communications service, send the first authorization message to the physical layer management module 1022 of the first baseband communications processor 102, couple the physical layer management module 1022 of the first baseband communications processor 102 to the RF processor 101, and instruct the second baseband communications processor 103 to stop performing the second communications service.

Figure 7:
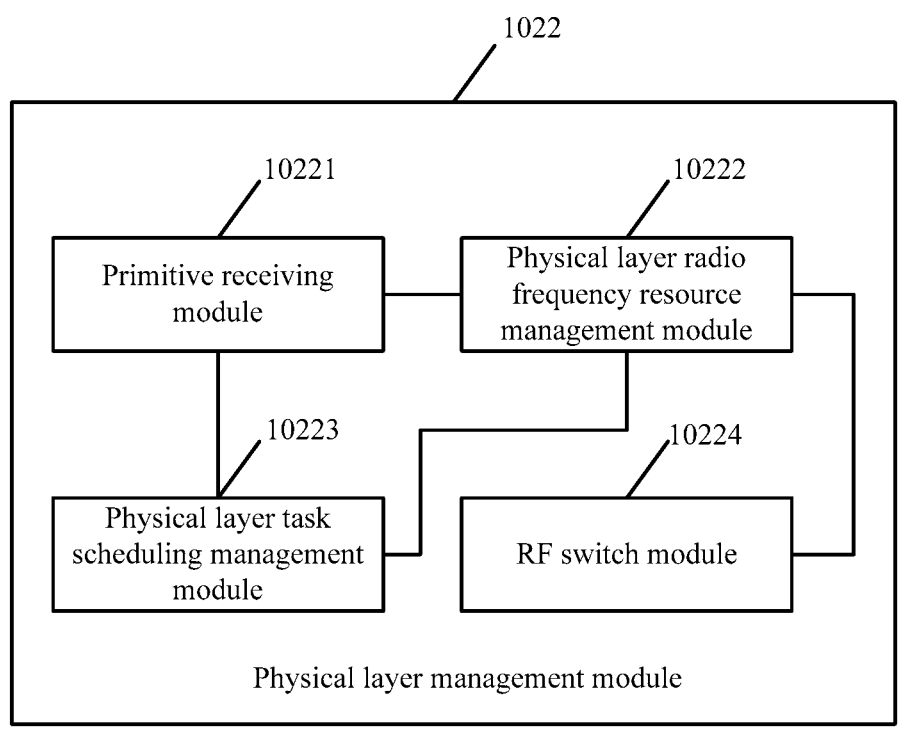
FIG. 7 is a schematic structural diagram of a physical layer management module according to an embodiment of the present invention.

In this optional embodiment, as an optional implementation manner, the physical layer management module 1022 may include a primitive receiving module 10221, a physical layer radio frequency resource management module 10222, a physical layer task scheduling management module 10223, and an RF switch module 10224. A structure of the physical layer management module 1022 may be shown in FIG. 7. FIG. 7 is a schematic structural diagram of a physical layer management module according to this embodiment of the present invention.

The primitive receiving module 10221 is configured to: receive the first notification message which indicates that there is the first communications service and sent by the RRC module 1021 of the first baseband communications processor 102; convert the first communications service into a physical layer task; if the converted physical layer task is a startup task, trigger the physical layer radio frequency resource management module 10222 to send the resource request to apply, in response to the converted physical layer task, for the permission to use the RF processor 101; and if the converted physical layer task is a stopping task, trigger the physical layer radio frequency resource management module 10222 to release the permission to use the RF processor 101.

The physical layer radio frequency resource management module 10222 is configured to: send the resource request to the RCM module 1041; after receiving the first authorization message from the RCM module 1041, directly operate the RF switch module 10224 to enable the RF processor 101; and after the physical layer task is complete, directly operate the RF switch module 10224 to disable the RF processor 101.

The physical layer radio frequency resource management module 10222 may be further configured to: after the permission to use the RF processor 101 is preempted, perform a backup operation on a suspended physical layer task.

The physical layer task scheduling management module 10223 is configured to: schedule all physical layer tasks at the physical layer; before a periodic physical layer task (for example, a periodic demodulation paging task) starts, trigger the physical layer radio frequency resource management module 10222 to apply, in response to the periodic physical layer task, for the permission to use the RF processor 101; use the RF processor 101 to schedule the periodic physical layer task after the physical layer radio frequency resource management module 10222 obtains, in response to the periodic physical layer task, the permission to use the RF processor 101; and after the periodic physical layer task is complete, trigger the physical layer radio frequency resource management module 10222 to release the permission to use the RF processor 101.

In this optional embodiment, as another optional implementation manner, a specific manner in which the RCM module 1041 instructs the second baseband communications processor 103 to stop performing the second communications service may be as follows:

The RCM module 1041 sends a preemption indication message to the second baseband communications processor 103, so that the second baseband communications processor 103 returns a preemption indication response message in response to the preemption indication message after releasing the permission to use the RF processor 101. The preemption indication message is used to instruct the second baseband communications processor 103 to stop performing the second communications service, release the permission to use the RF processor 101, and perform a backup operation on the second communications service. The preemption indication response message indicates that the permission to use the RF processor 101 has been released by the second baseband communications processor 103. A specific manner in which the second baseband communications processor 103 performs a backup operation on the second communications service may be: storing related context such as a state of the second communications service and a configuration parameter of the RF processor 101 when execution of the second communications service stops. In this way, the second baseband communications processor 103 can quickly resume performing the second communications service according to the stored related context when re-obtaining, in response to the second communications service, the permission to use the RF processor 101.

In this optional embodiment, when a SIM card has a service requirement for a communications service, a baseband communications processor of the SIM card sends a notification message, indicating that there is a communications service on the SIM card, to a physical layer management module of the SIM card. The physical layer management module of the SIM card converts the communications service on the SIM card into a physical layer task, and applies, in response to the converted physical layer task, to the RCM module 1041 of the manager 104 for the permission to use the RF processor 101. If the RF processor 101 is not authorized for another SIM card to use in a time period required for using the RF processor 101 by the SIM card, the RCM module 1041 of the manager 104 directly authorizes the permission to use the RF processor 101 for the physical layer management module of the SIM card; if the RF processor 101 is authorized for another SIM card to use in at least a part of a time period required for using the RF processor 101 by the SIM card, and a priority of a type of a communications service performed by the another SIM card by using the RF processor 101 is lower than a priority of a type of the communications service on the SIM card with the service requirement for the communications service, the RCM module 1041 of the manager 104 first withdraws the permission to use the RF processor 101 from the another SIM card, and then authorizes, for the SIM card with the service requirement for the communications service, the permission to use the RF processor; or if the RF processor 101 is authorized for another SIM card to use in at least a part of a time period required for using the RF processor 101 by the SIM card, and a priority of a type of a communications service performed by the another SIM card by using the RF processor 101 is not lower than a priority of a type of the communications service on the SIM card with the service requirement for the communications service, the RCM module 1041 of the manager 104 directly sends a resource request failure message to the physical layer management module of the SIM card with the service requirement for the communications service. The resource request failure message indicates that the permission to use the RF processor 101 is not authorized for the physical layer management module of the SIM card with the service requirement for the communications service.

Figure 4:
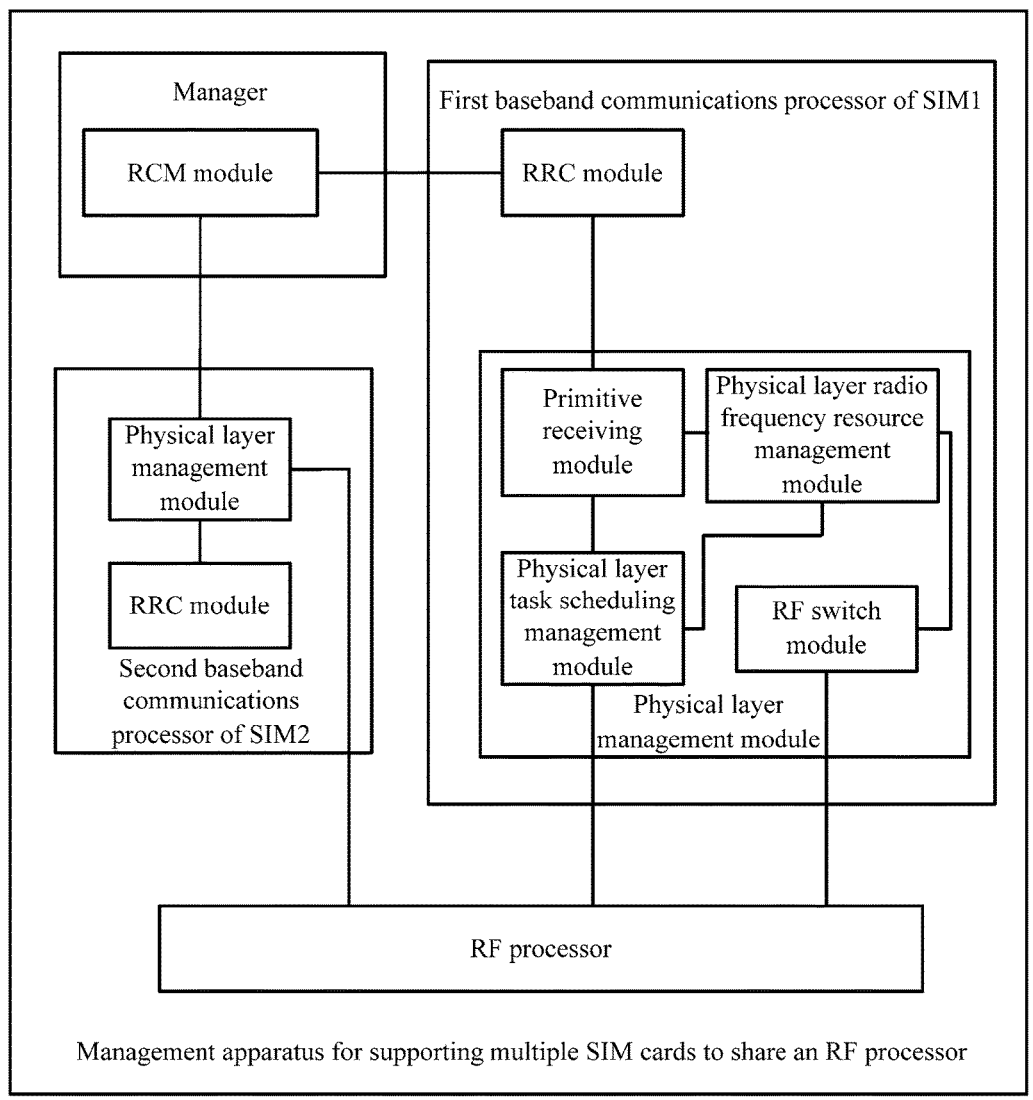
FIG. 4 is a schematic structural diagram of yet another management apparatus for supporting multiple SIM cards to share an RF processor according to an embodiment of the present invention.

In this optional embodiment, for example, it is assumed that there is one first SIM card, there is one second SIM card, the first SIM card is SIM1 and supports a communications network standard of a long term evolution (LTE) mode ("L mode" for short), the second SIM card is SIM2 and supports a communications network standard of a Global System for Mobile Communications (GSM) mode ("G mode" for short), and a physical layer management module of SIM2 has obtained a permission to use an RF processor and is using the RF processor to perform a second communications service. In this case, the management apparatus for supporting multiple SIM cards to share an RF processor may be shown in FIG. 4. FIG. 4 is a schematic structural diagram of still another management apparatus for supporting multiple SIM cards to share an RF processor according to an embodiment of the present invention. The apparatus shown in FIG. 4 implements sharing of the RF processor between the L mode and the G mode. A principle of implementing sharing of the RF processor between the L mode and the G mode is as follows:

When there is a service requirement for a first communications service, an RRC module of SIM1 sends, to a primitive receiving module of SIM1, a notification message used to indicate that there is the first communications service on SIM1. After receiving the notification message, the primitive receiving module of SIM1 converts the first communications service into a physical layer task, and triggers a physical layer radio frequency resource management module of SIM1 to send, to an RCM module of a manager, a resource request used to obtain a permission to use an RF processor. The RCM module of the manager compares, after receiving the resource request, whether a priority of a type of the first communications service is higher than a priority of a type of the second communications service, and if yes, sends, to the physical layer radio frequency resource management module of SIM1, an authorization message used to authorize, for a physical layer management module of SIM1, the permission to use the RF processor, and instructs the physical layer management module of SIM2 to stop performing the second communications service. The physical layer radio frequency resource management module of SIM1 operates, after receiving the authorization message sent by the RCM module of the manager, an RF switch module to enable the RF processor at a time t1 (which is a next subframe by default). If the RF processor is used for no physical layer task in the physical layer management module of SIM1 at the time t1, the physical layer radio frequency resource management module of SIM1 operates the RF switch module in a unified manner to enable the RF processor, and notifies, at a time t2 (which is a next subframe by default) after enabling the RF processor, the primitive receiving module that the permission to use the RF processor has been obtained in response to the converted physical layer task. The physical layer radio frequency resource management module operates the RF switch module to disable the RF processor at a time t3 (which is a next subframe by default) after execution of the converted physical layer task is complete, to release the permission to use the RF processor. If no physical layer task in the physical layer management module of SIM1 needs to use the RF processor at the time t3, the physical layer radio frequency resource management module operates the RF switch module in a unified manner to disable the RF processor, and sends, to the RCM module of the manager at a time t4 (which is a next subframe by default) after the RF processor is disabled, a resource release indication message used to indicate that the permission to use the RF processor has been released, so that the RCM module of the manager withdraws the permission to use the RF processor after receiving the resource release indication message. If the converted physical layer task is preempted in an execution process, the physical layer radio frequency resource management module of SIM1 performs a backup operation on the converted physical layer task at a time t5 (which includes two subframes by default) after a preemption indication message sent by the RCM module of the manager is received and before preemption starts, and operates the RF switch module to disable the RF processor at a time t6 (which includes one subframe by default) before the preemption starts. The backup operation includes storing related context such as a current state of the converted physical layer task and a configuration parameter of the RF processor. Moreover, the physical layer radio frequency resource management module returns a preemption indication response message to the RCM module of the manager at a subframe at which the preemption starts. If a resumption indication message sent by the RCM module of the manager is received, the physical layer radio frequency resource management module of SIM1 operates the RF switch module to enable the RF processor at a time t7 (which includes one subframe by default) after the resumption indication message is received, and resumes, according to the related context previously stored during the backup operation, performing the previously preempted physical layer task at a time t8 (which includes two subframes by default) after the resumption indication message is received.

Figure 10:
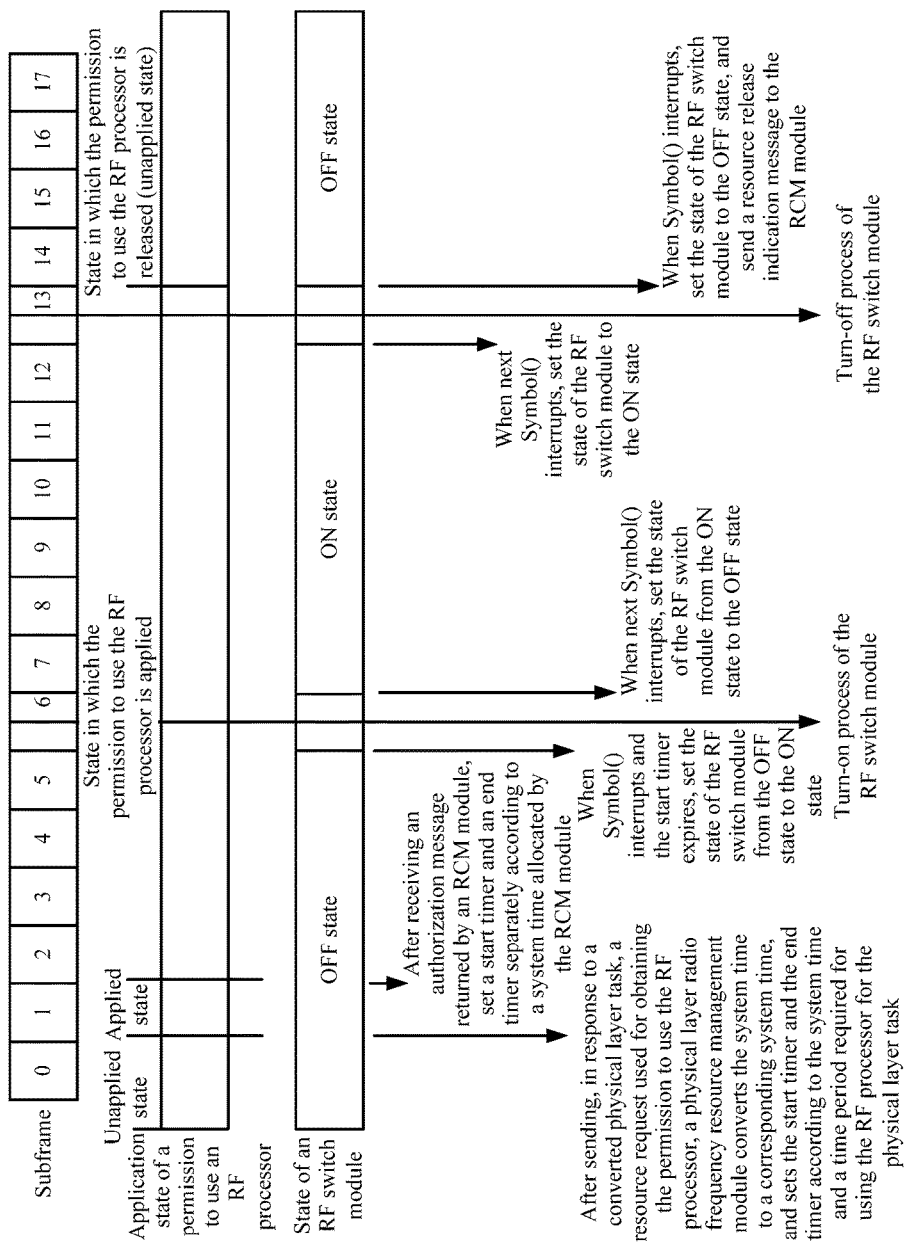
FIG. 10 is a diagram of a correspondence among an application state of a permission to use an RF processor, a turn-on/turn-off state of an RF switch module, and a time according to an embodiment of the present invention.

In a process of sending the resource request to the manager when there is the first communications service on SIM1, performing the first communications service after obtaining the permission to use the RF processor, and releasing the permission to use the RF processor after execution of the first communications service is complete, for SIM1, a correspondence among an application state of the RF processor, a turn-on/turn-off state of the RF switch module, and a time may be shown in FIG. 10. FIG. 10 is a diagram of a correspondence among an application state of a permission to use an RF processor, a turn-on/turn-off state of an RF switch module, and a time. As shown in FIG. 10, when there is no first communications service on SIM1, a first baseband communications processor of SIM1 does not apply for a permission to use an RF processor. When there is a first communications service on SIM1, a physical layer radio frequency resource management module of a first baseband communications processor of SIM1 sends a resource request to an RCM module of a manager, and obtains a permission to use the RF processor after receiving an authorization message returned by the RCM module. The RF switch module is always in a turn-off state before execution of the first communications service starts, and the state of the RF switch module changes from the turn-off state to a turn-on state when the execution of the first communications service starts. The physical layer radio frequency resource management module of the first baseband communications processor of SIM1 releases the permission to use the RF processor after the execution of the first communications service is complete, and the state of the RF switch module changes from the turn-on state to the turn-off state.

Figure 3:
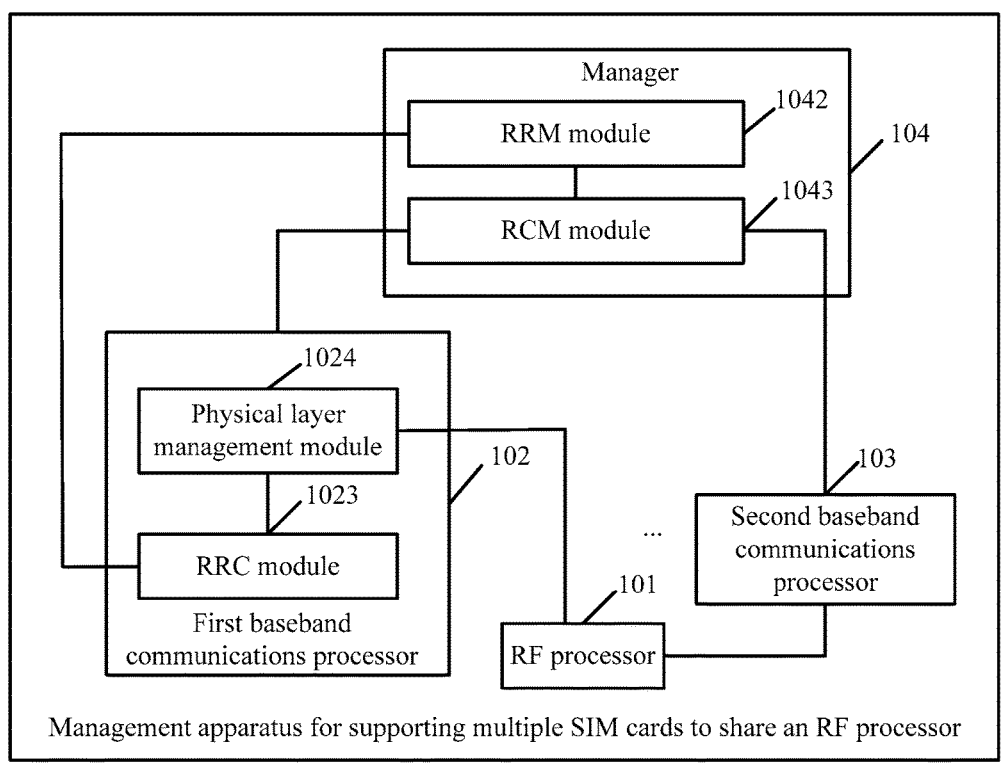
FIG. 3 is a schematic structural diagram of still another management apparatus for supporting multiple SIM cards to share an RF processor according to an embodiment of the present invention.

In another optional embodiment, the first baseband communications processor 102 may include an RRC module 1023 and a physical layer management module 1024, and the manager 104 may include a radio resource management (RRM) module 1042 and an RCM module 1043. The resource request is sent by the RRC module 1023 to the RRM module 1042 of the manager 104. In this case, a structure of the management apparatus for supporting multiple SIM cards to share an RF processor may be shown in FIG. 3. FIG. 3 is a schematic structural diagram of yet another management apparatus for supporting multiple SIM cards to share an RF processor according to an embodiment of the present invention.

The RRC module 1023 is configured to: implement processing of a radio resource control communications protocol for the first SIM card, and send the resource request to the RRM module 1042 of the manager 104 when there is the first communications service on the first SIM card.

The physical layer management module 1024 is configured to implement processing of a physical layer communications protocol for the first SIM card.

The RRM module 1042 is configured to: receive the resource request sent by the RRC module 1023 of the first baseband communications processor 102; determine whether the RF processor 101 is authorized for the second baseband communications processor 103 to perform the second communications service in at least the part of the time period; when the result of the determination is yes, compare whether the priority of the type of the first communications service is higher than the priority of the type of the second communications service; and when the priority of the type of the first communications service is higher than the priority of the type of the second communications service, send the first authorization message to the RCM module 1043.

The RCM module 1043 is configured to: receive the first authorization message sent by the RRM module 1042, send the first authorization message to the physical layer management module 1024 of the first baseband communications processor 102, couple the physical layer management module 1024 to the RF processor 101, and instruct the second baseband communications processor 103 to stop performing the second communications service.

In the another optional embodiment, as an optional implementation manner, a specific manner in which the RCM module 1043 instructs the second baseband communications processor 103 to stop performing the second communications service may be as follows:

The RCM module 1043 sends a preemption indication message to the second baseband communications processor 103, so that the second baseband communications processor 103 returns a preemption indication response message in response to the preemption indication message after releasing the permission to use the RF processor 101. The preemption indication message is used to instruct the second baseband communications processor 103 to stop performing the second communications service, release the permission to use the RF processor 101, and perform a backup operation on the second communications service. The preemption indication response message indicates that the permission to use the RF processor 101 has been released by the second baseband communications processor 103. A specific manner in which the second baseband communications processor 103 performs a backup operation on the second communications service may be: storing related context such as a state of the second communications service and a configuration parameter of the RF processor 101 when execution of the second communications service stops.

In some embodiments, a specific manner in which the manager 104 compares whether the priority of the type of the first communications service is higher than the priority of the type of the second communications service may be:

determining whether the second communications service is pre-emptible; and when the second communications service is pre-emptible, comparing whether the priority of the type of the first communications service is higher than the priority of the type of the second communications service.

In some embodiments, the manager 104 may be further configured to send a resource request failure message to the first baseband communications processor 102 when the priority of the type of the first communications service is lower than or equal to the priority of the type of the second communications service, and the resource request failure message indicates that the first baseband communications processor 102 is not authorized to use the RF processor 101 to perform the first communications service.

In some embodiments, the first baseband communications processor 102 may be further configured to send a resource release indication message to the manager 104 after execution of the first communications service is complete, and the resource release indication message indicates that the permission to use the RF processor 101 has been released by the first baseband communications processor 102. The manager 104 may be further configured to: receive the resource release indication message sent by the first baseband communications processor 102, return a resource release indication confirmation message to the first baseband communications processor 102, and send a second authorization message to the second baseband communications processor 103. The second authorization message is used to authorize the second baseband communications processor 103 to continue to use the RF processor 101 to perform the second communications service. The second baseband communications processor 103 may be further configured to: receive the second authorization message sent by the manager 104 and continues to perform the second communications service. Further, in some embodiments, the second baseband communications processor 103 may specifically continue to perform the second communications service according to the related context stored when the execution of the second communications service stops.

In some embodiments, the resource request may further include a preemption attribute of the first communications service, and the preemption attribute indicates whether the first communications service is pre-emptible.

In some embodiments, each first SIM card supports at least one communications network standard, and each second SIM card supports at least one communications network standard. Different SIM cards may support at least one same communications network standard, or may support completely different communications network standards, which is not limited in this embodiment of the present invention. The communications network standard supported by each SIM card may include any one or a combination of the following: a GSM mode ("G mode" for short), a LTE mode ("L mode" for short), a W-CDMA mode ("W mode" for short), a Code Division Multiple Access (CDMA) mode ("C mode" for short), a Time Division Long Term Evolution (TD-LTE) mode, a frequency-division duplex Long Term Evolution (FDD-LTE) mode, and a Time Division-Synchronous Code Division Multiple Access (TD-SCDMA) mode ("T mode" for short), which is not limited in this embodiment of the present invention.

It can be learned that in this embodiment of the present invention, a permission to use an RF processor can be properly allocated according to a priority of a type of a communications service, thereby improving flexibility of allocating the permission to use the RF processor.

Figure 5:
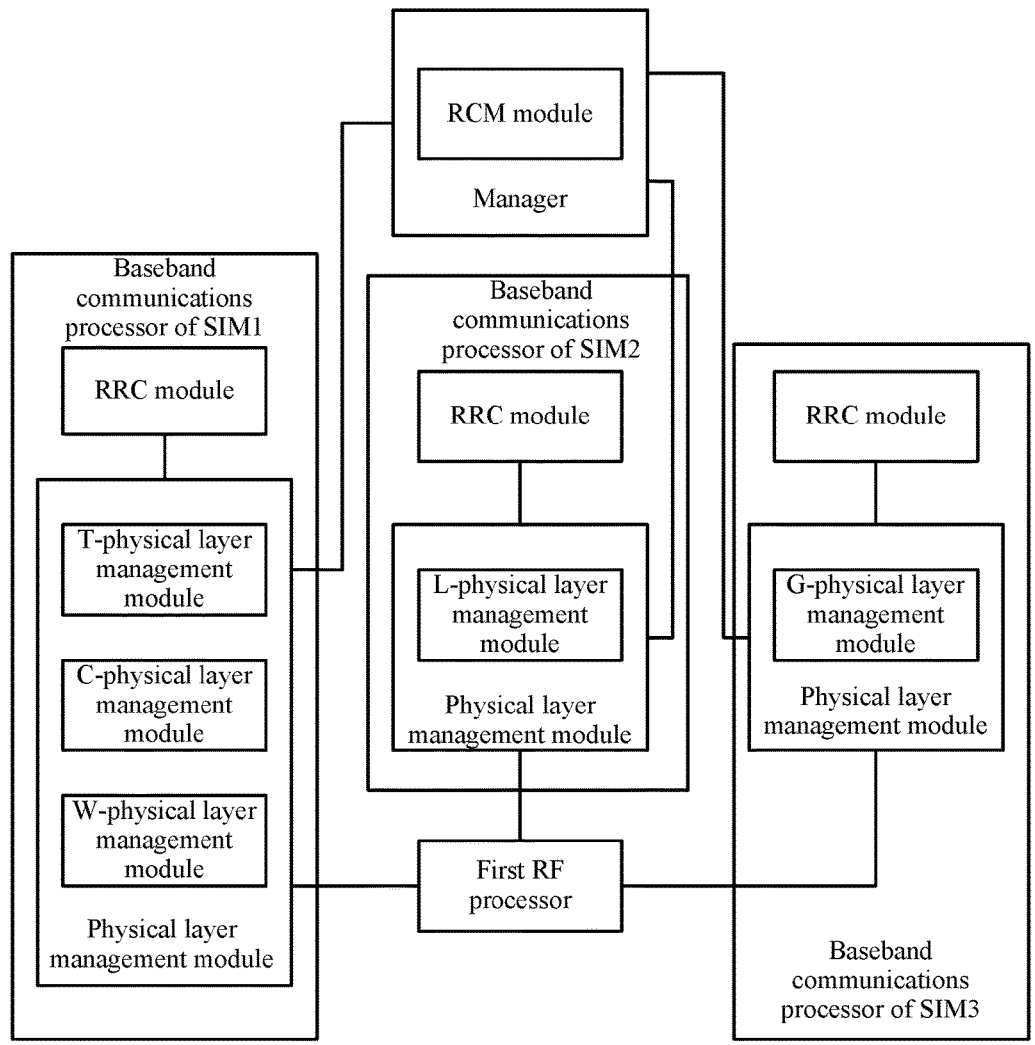
FIG. 5 is a schematic structural diagram of still yet another management apparatus for supporting multiple SIM cards to share an RF processor according to an embodiment of the present invention.

Referring to FIG. 5, FIG. 5 is a schematic structural diagram of still yet another management apparatus for supporting multiple SIM cards to share an RF processor according to an embodiment of the present invention. The apparatus shown in FIG. 5 may be applied to a mobile terminal which can support three SIM cards (SIM1, SIM2, and SIM3), and implement sharing of an RF processor among an L mode, a T mode, a C mode, a W mode, and a G mode. As shown in FIG. 5, the apparatus may include a baseband communications processor of SIM1, a baseband communications processor of SIM2, a baseband communications processor of SIM3, a manager, and a first RF processor. SIM1 supports three communications network standards of the W mode, the T mode, and the C mode; SIM2 supports a communications network standard of the L mode; SIM3 supports a communications network standard of the G mode. The baseband communications processor of SIM1 includes an RRC module of SIM1, a T-mode physical layer management module (T-physical layer management module), a C-mode physical layer management module (C-physical layer management module), and a W-mode physical layer management module (C-physical layer management module). The baseband communications processor of SIM2 may include an RRC module of SIM2 and an L-mode physical layer management module (L-physical layer management module). The baseband communications processor of SIM3 may include an RRC module of SIM3 and a G-mode physical layer management module (G-physical layer management module). The manager may include an RCM module. A principle that the apparatus in FIG. 5 implements that multiple SIM cards are supported to share an RF processor is as follows:

An RRC module of a SIM card with a service requirement for a communications service sends, to a corresponding physical layer management module according to a communications network standard to which the communications service belongs, a notification message used to indicate that there is a communications service belonging to a specific communications network standard on the SIM card. The corresponding physical layer management module sends, to the RCM module of the manager according to the notification message, a resource request used to apply for a permission to use the first RF processor. The RCM module of the manager authorizes, according to a priority of a type of the communications service included in the received resource request, the permission to use the first RF processor to a physical layer management module corresponding to a type, of the highest priority, of a communications service.

Figure 6:
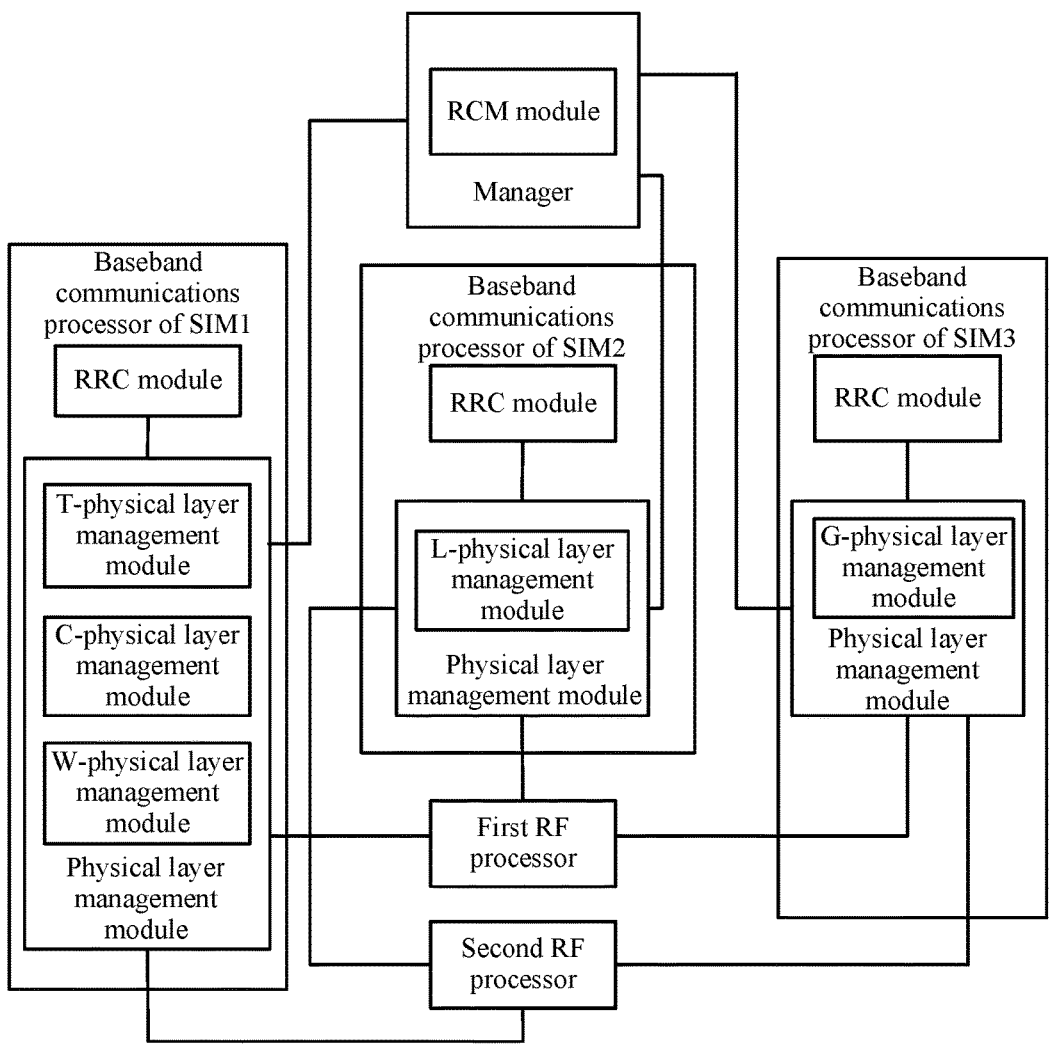
FIG. 6 is a schematic structural diagram of a further management apparatus for supporting multiple SIM cards to share an RF processor according to an embodiment of the present invention.

In some embodiments, on a basis of the structure of the apparatus shown in FIG. 5, the management apparatus for supporting multiple SIM cards to share an RF processor may further include a second RF processor. In this case, a structure of the management apparatus for supporting multiple SIM cards to share an RF processor may be shown in FIG. 6. FIG. 6 is a schematic structural diagram of a further management apparatus for supporting multiple SIM cards to share an RF processor according to an embodiment of the present invention. The second RF processor is configured to receive a downlink signal corresponding to a downlink communications service when a first RF processor is configured to perform a communications service belonging to a specific communications network standard and when another communications network standard is required for performing the downlink communications service, for example, a demodulation paging message.

It can be learned that in this embodiment of the present invention, an RF processor can be shared among all modes, and a permission to use the RF processor can also be properly allocated according to a priority of a type of a communications service.

Figure 8:
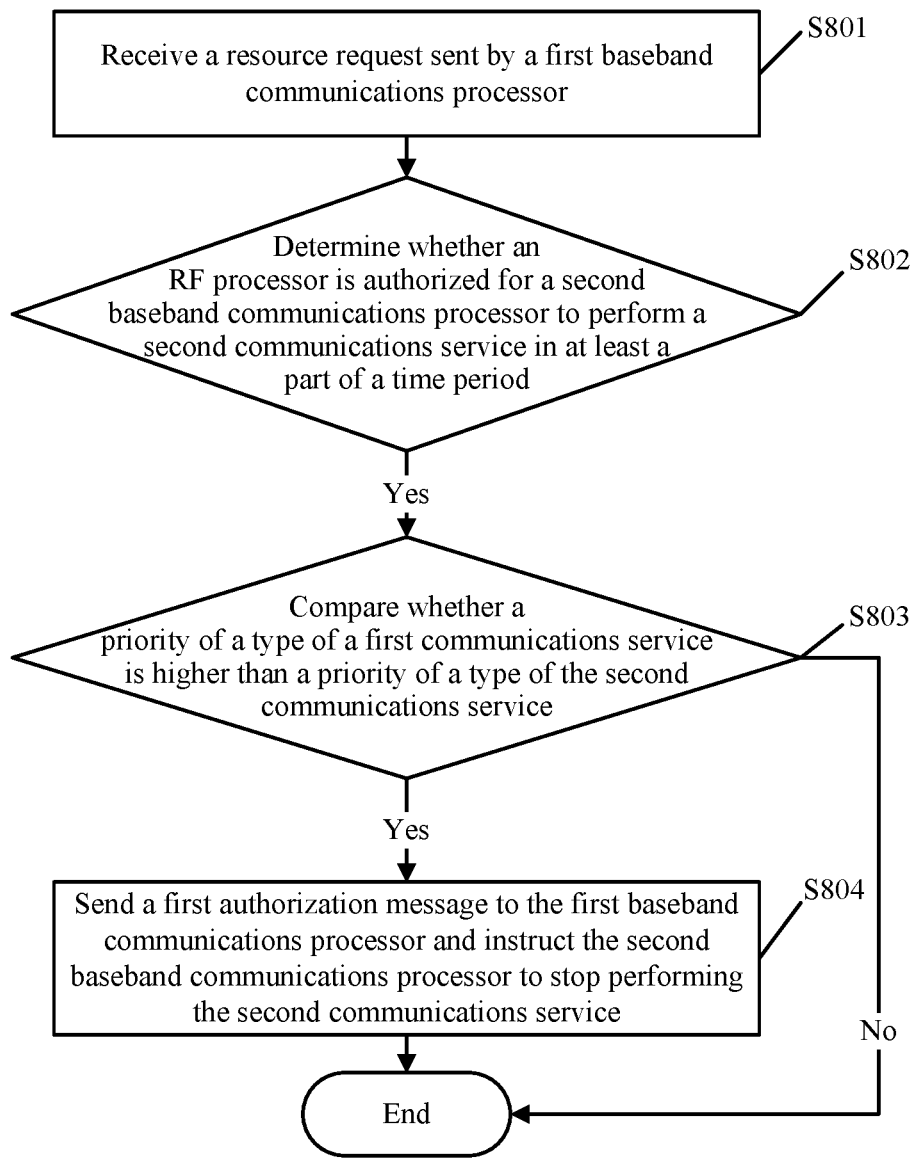
FIG. 8 is a schematic flowchart of a management method for supporting multiple SIM cards to share an RF processor according to an embodiment of the present invention.

Referring to FIG. 8, FIG. 8 is a schematic flowchart of a management method for supporting multiple SIM cards to share an RF processor according to an embodiment of the present invention. The method shown in FIG. 8 may be implemented by a manager in the foregoing embodiments. That is, the method shown in FIG. 8 may be applied to a mobile terminal which can support multiple SIM cards. As shown in FIG. 8, the management method for supporting multiple SIM cards to share an RF processor may include the following steps.

S801: Receive a resource request sent by a first baseband communications processor.

In this embodiment of the present invention, the first baseband communications processor is configured to implement a first communications service on a first SIM card, the resource request is used to request, in response to the first communications service on the first SIM card, a permission to use the RF processor, and the resource request may include a type of the first communications service on the first SIM card and a time period required for using the RF processor.

S802: Determine whether the RF processor is authorized for a second baseband communications processor to perform a second communications service on a second SIM card in at least a part of a time period.

In this embodiment of the present invention, when a result of the determination in step S802 is yes, step S803 is performed; or when a result of the determination in step S802 is no, the first baseband communications processor may be directly authorized to use the RF processor to perform the first communications service.

S803: Compare whether a priority of a type of a first communications service is higher than a priority of a type of the second communications service.

In this embodiment of the present invention, when the priority of the type of the first communications service is higher than the priority of a type of the second communications service, step S804 is performed; or when the priority of the type of the first communications service is lower than or equal to the priority of the type of the second communications service, this procedure may end, or a resource request failure message may be sent to the first baseband communications processor. The resource request failure message indicates that the first baseband communications processor is not authorized to use the RF processor to perform the first communications service.

In this embodiment of the present invention, the type of the first communications service and the type of the second communications service may be determined according to a QCI of a communications service. After the type of the first communications service and the type of the second communications service are determined, the priority of the type of the first communications service and the priority of the type of the second communications service may be determined separately according to a standard QCI attribute listed in Table 1.

S804: Send a first authorization message to the first baseband communications processor and instruct the second baseband communications processor to stop performing the second communications service.

In this embodiment of the present invention, the first authorization message is used to authorize the first baseband communications processor to use the RF processor to perform the first communications service.

In an optional embodiment, the resource request may be sent from a physical layer of the first baseband communications processor. In this case, the method according to this embodiment of the present invention is specifically implemented by an RCM module of the manager.

In another optional embodiment, the resource request may be sent from an RRC layer of the first baseband communications processor. In this case, the method according to this embodiment of the present invention is specifically implemented by an RRM module of the manager. In this optional embodiment, the sending a first authorization message to the first baseband communications processor may include:

sending the first authorization message to an RCM module of the manager, so that the RCM module of the manager sends the first authorization message to the first baseband communications processor.

In still another optional embodiment, the comparing whether a priority of a type of a first communications service is higher than a priority of a type of the second communications service may include:

determining whether the second communications service is pre-emptible; and when the second communications service is pre-emptible, comparing whether the priority of the type of the first communications service is higher than the priority of the type of the second communications service.

In yet another optional embodiment, after step S804 is executed, the following operations may be further executed:

receiving a resource release indication message sent by the first baseband communications processor, where the resource release indication message indicates that the permission to use the RF processor has been released by the first baseband communications processor; and sending a second authorization message to the second baseband communications processor according to the resource release indication message, where the second authorization message is used to authorize the second baseband communications processor to continue to use the RF processor to perform the second communications service.

In some embodiments, the resource request may further include a preemption attribute of the first communications service, and the preemption attribute indicates whether the first communications service is pre-emptible.

In some embodiments, the first SIM card may support at least one communications network standard, and the second SIM card may support at least one communications network standard. The first SIM card and the second SIM card may support at least one same communications network standard, or may support completely different communications network standards, which is not limited in this embodiment of the present invention.

In this embodiment of the present invention, after a resource request sent by a first baseband communications processor is received, whether an RF processor is authorized for a second baseband communications processor to perform a second communications service in at least a part of a time period required for using the RF processor by the first baseband communications processor is determined; if yes, whether a priority of a type of a first communications service that needs to be performed by the first baseband communications processor is higher than a priority of a type of the second communications service performed by the second baseband communications processor is compared; and if yes, an authorization message is sent to the first baseband communications processor and the second baseband communications processor is instructed to stop performing the second communications service. It can be learned that in this embodiment of the present invention, a permission to use an RF processor can be properly allocated according to a priority of a type of a communications service.

It can be understood that each part of the apparatus provided in this embodiment of the present invention may include a large quantity of transistors to form a first baseband communications processor 102, a second baseband communications processor 103, an RF processor 101, and a manager 104. The RF processor 101 may be a radio frequency integrated circuit (RFIC), the first baseband communications processor 102 and the second baseband communications processor 103 may be integrated into one system on chip (SoC), and the manager 104 may be also integrated into the SOC.

Figure 9A:
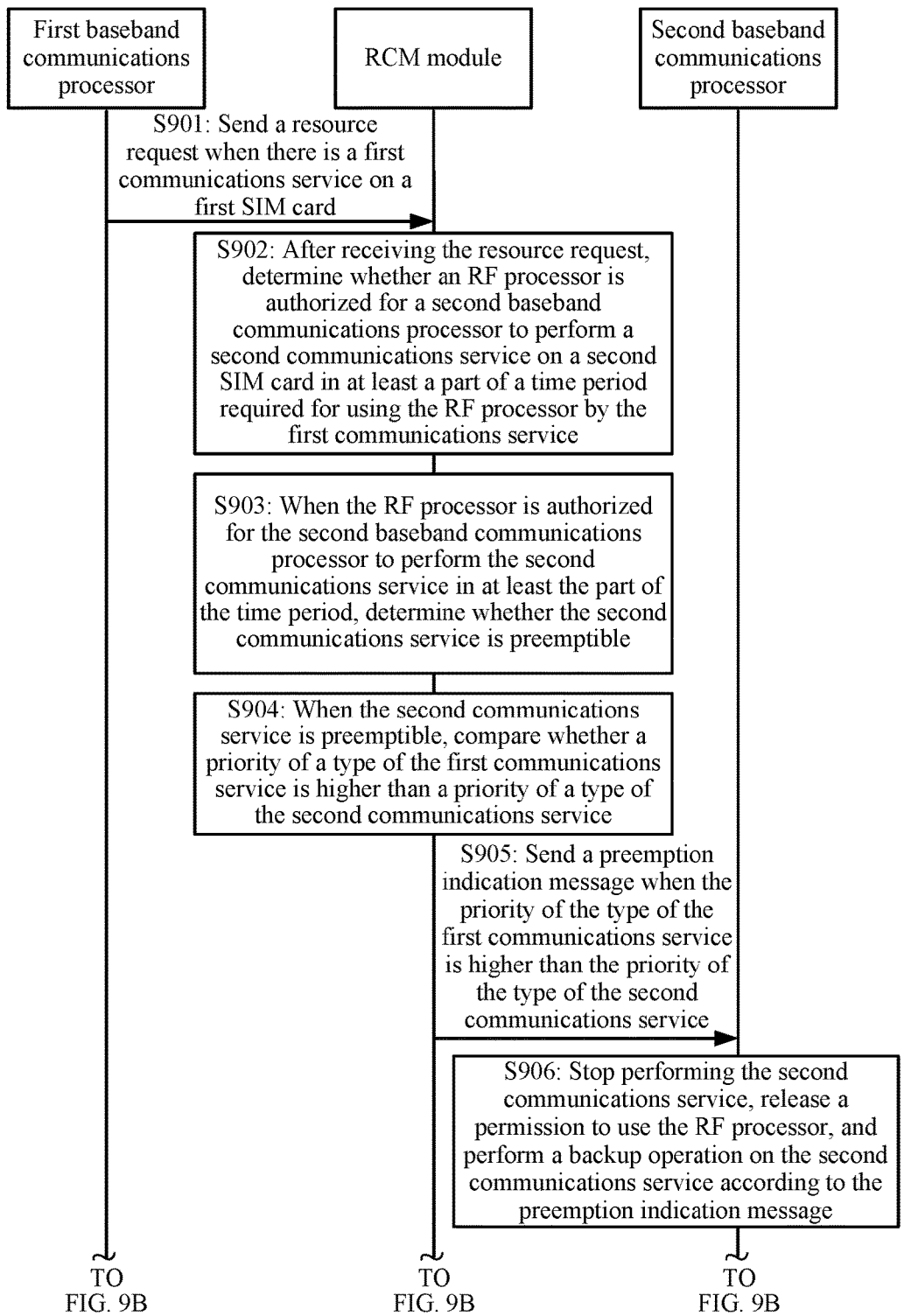
FIG. 9A and FIG. 9B are a schematic flowchart of another management method for supporting multiple SIM cards to share an RF processor according to an embodiment of the present invention.
Figure 9B:
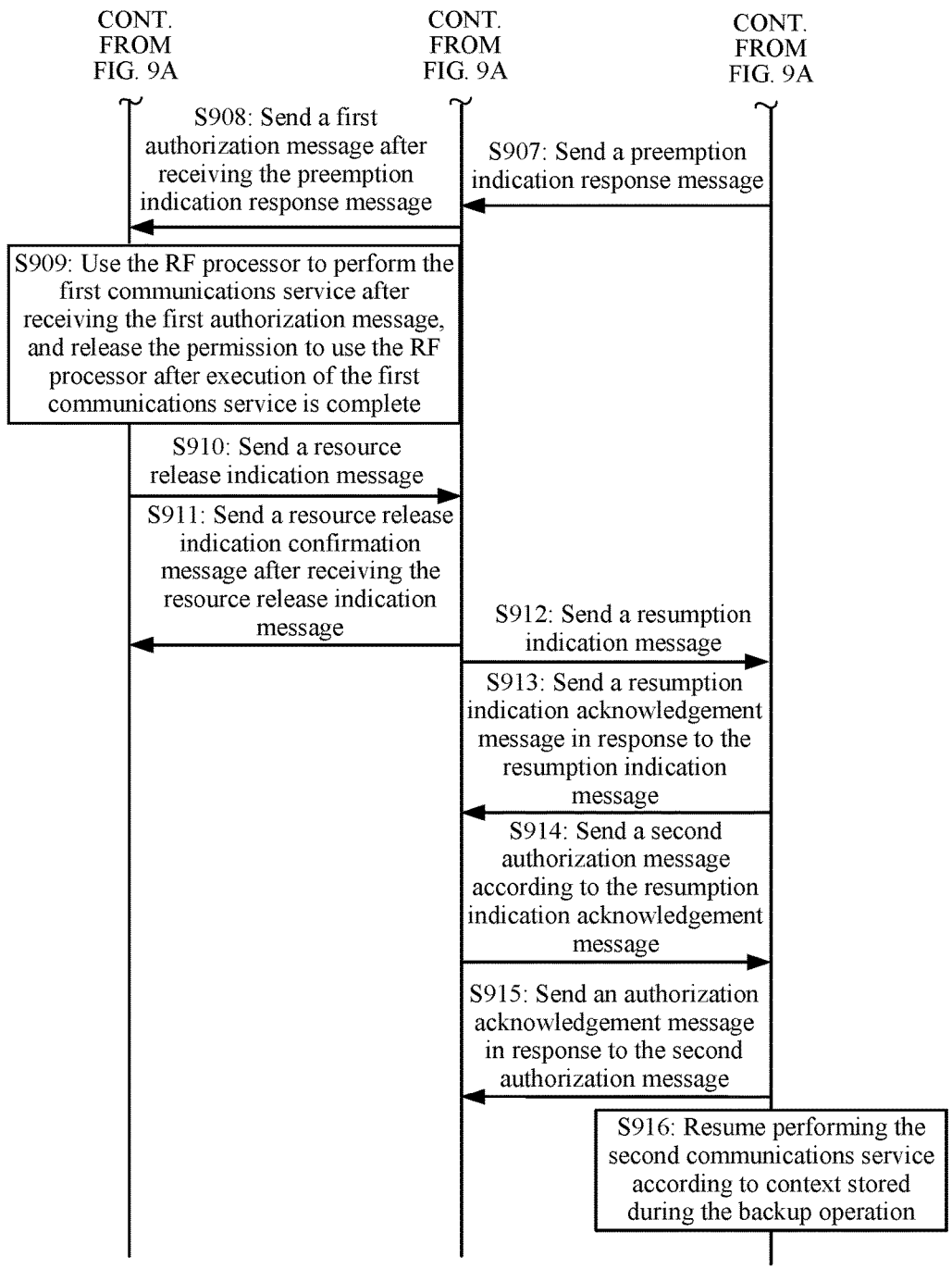

Referring to FIG. 9A and FIG. 9B, FIG. 9A and FIG. 9B are a schematic flowchart of another management method for supporting multiple SIM cards to share an RF processor according to an embodiment of the present invention. The method shown in FIG. 9A and FIG. 9B is implemented by an RCM module of a manager, a first baseband communications processor, and a second baseband communications processor together. The first baseband communications processor is configured to implement processing of a radio resource control communications protocol for a first SIM card, and the second baseband communications processor is configured to implement processing of a radio resource control communications protocol for a second SIM card. As shown in FIG. 9A and FIG. 9B, the management method for supporting multiple SIM cards to share an RF processor may include the following steps.

S901: The first baseband communications processor sends a resource request to the RCM module when there is a first communications service on the first SIM card.

In this embodiment of the present invention, the resource request is used to request, in response to the first communications service, a permission to use the RF processor, and the resource request may include a type of the first communications service and a time period required for using the RF processor. The resource request is specifically sent by a physical layer management module of the first baseband communications processor to the RCM module when there is the first communications service on the first SIM card, and the resource request may be ID_PHY_RCM_TASK_APPLY_REQ.

S902: After receiving the resource request, the RCM module determines whether the RF processor is authorized for the second baseband communications processor to perform a second communications service on the second SIM card in at least a part of a time period required for using the RF processor by the first communications service.

S903: When the RF processor is authorized to perform the second communications service for the second baseband communications processor in at least the part of the time period, the RCM module determines whether the second communications service is pre-emptible.

S904: When the second communications service is pre-emptible, the RCM module compares whether a priority of a type of the first communications service is higher than a priority of a type of the second communications service.

S905: The RCM module sends a preemption indication message to the second baseband communications processor when the priority of the type of the first communications service is higher than the priority of the type of the second communications service.

In this embodiment of the present invention, the preemption indication message is used to instruct the second baseband communications processor to stop performing the second communications service, release the permission to use the RF processor, and perform a backup operation on the second communications service. The preemption indication message is specifically sent by the RCM module to a physical layer management module of the second baseband communications processor, and the preemption indication message may be ID_RCM_PHY_TASK_PREEMPT_IND.

S906: The second baseband communications processor stops performing the second communications service, releases a permission to use the RF processor, and performs a backup operation on the second communications service according to the preemption indication message.

In this embodiment of the present invention, the backup operation performed by the second baseband communications processor on the second communications service may include storing related context such as a state of the second communications service and a configuration parameter of the RF processor when execution of the second communications service stops.

S907: The second baseband communications processor sends a preemption indication response message to the RCM module.

In this embodiment of the present invention, the preemption indication response message indicates that the permission to use the RF processor has been released by the second baseband communications processor, the preemption indication response message is specifically sent by the physical layer management module of the second baseband communications processor to the RCM module, and the preemption indication response message may be ID_PHY_RCM_TASK_PREEMPT_ACK.

S908: The RCM module sends a first authorization message to the first baseband communications processor after receiving the preemption indication response message.

In this embodiment of the present invention, the first authorization message is used to authorize the first baseband communications processor to use the RF processor to perform the first communications service, the first authorization message is sent by the RCM module to the physical layer management module of the first baseband communications processor in response to the resource request, and the first authorization message may be ID_RCM_PHY_TASK_APPLY_CFN.

S909: The first baseband communications processor uses the RF processor to perform the first communications service after receiving the first authorization message, and releases the permission to use the RF processor after execution of the first communications service is complete.

S910: The first baseband communications processor sends a resource release indication message to the RCM module.

In this embodiment of the present invention, the resource release indication message indicates that the permission to use the RF processor has been released by the first baseband communications processor, the resource release indication message is specifically sent by the physical layer management module of the first baseband communications processor to the RCM module, and the resource release indication message may be ID_PHY_RCM_TASK_RELEASE_REQ.

S911: The RCM module sends a resource release indication confirmation message to the first baseband communications processor after receiving the resource release indication message.

In this embodiment of the present invention, the resource release indication confirmation message is sent by the RCM module to the physical layer management module of the first baseband communications processor in response to the resource release indication message, and the resource release indication confirmation message may be ID_RCM_PHY_TASK_RELEASE_CFN.

S912: The RCM module sends a resumption indication message to the second baseband communications processor.

In this embodiment of the present invention, the resumption indication message is used to instruct the second baseband communications processor to resume performing the second communications service, the resumption indication message is sent by the RCM module to the physical layer management module of the second baseband communications processor, and the resumption indication message may be ID_PHY_RCM_TASK_RESUME_IND.

S913: The second baseband communications processor sends, to the RCM module, a resumption indication acknowledgement message in response to the resumption indication message.

In this embodiment of the present invention, the resumption indication acknowledgement message is used to confirm that the execution of the second communications service needs to be resumed, the resumption indication acknowledgement message is sent by the physical layer management module of the second baseband communications processor to the RCM module, and the resumption indication acknowledgement message may be ID_PHY_RCM_TASK_RESUME_ACK.

S914: The RCM module sends a second authorization message to the second baseband communications processor according to the resumption indication acknowledgement message.

In this embodiment of the present invention, the second authorization message is used to authorize the second baseband communications processor to continue to use the RF processor to perform the second communications service, the second authorization message is sent by the RCM module to the physical layer management module of the second baseband communications processor, and the second authorization message may be ID_RCM_PHY_TASK_ASSING_IND.

S915: The second baseband communications processor sends, to the RCM module, an authorization acknowledgement message in response to the second authorization message.

In this embodiment of the present invention, the authorization acknowledgement message is sent by the physical layer management module of the second baseband communications processor to the RCM module, and the authorization acknowledgement message may be ID_PHY_RCM_TASK_ASSING_ACK.

S916: After receiving the second authorization message, the second baseband communications processor resumes performing the second communications service according to context stored during the backup operation.

It can be learned that in this embodiment of the present invention, sharing of an RF processor can be implemented, and a permission to use the RF processor can be properly allocated according to a preemption attribute of a communications service and a priority of the communications service.

It should be noted that, in the foregoing embodiments, the description of each embodiment has respective focuses. For a part that is not described in detail in an embodiment, reference may be made to related descriptions in other embodiments. In addition, a person skilled in the art should also appreciate that all the embodiments described in the specification are examples of embodiments, and the related actions and modules are not necessarily mandatory to the present invention.

A sequence of the steps of the method in the embodiments of the present invention may be adjusted, and certain steps may also be merged or removed according to an actual need.

A sequence of the modules of the apparatus in the embodiments of the present invention may be adjusted, and may also be merged or removed according to an actual need.

A person of ordinary skill in the art may understand that all or some of the steps of the methods in the embodiments may be implemented by a program instructing relevant hardware, such as a processor. The program may be stored in a computer readable storage medium. The storage medium may include: a flash memory, a read-only memory (ROM), a random access memory (RAM), a magnetic disk, or an optical disc.

The foregoing describes in detail a management method and apparatus for supporting multiple SIM cards to share an RF processor provided in the embodiments of the present invention. In this specification, specific examples are used to describe the principle and implementation manners of the present invention, and the description of the embodiments is only intended to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A management method for supporting multiple SIM cards to share an radio frequency (RF) processor, wherein the method comprises:
   receiving a resource request sent by a first baseband communications processor, wherein the first baseband communications processor is configured to implement a first communications service on a first SIM card, the resource request is used to request, in response to the first communications service, a permission to use the RF processor, and the resource request comprises a type of the first communications service and a time period required for using the RF processor;
   determining whether the RF processor is authorized to perform a second communications service on a second SIM card for a second baseband communications processor in at least a part of the time period;
   when the RF processor is authorized to perform the second communications service for the second baseband communications processor in at least the part of the time period, comparing whether a priority of the type of the first communications service is higher than a priority of a type of the second communications service; and
   when the priority of the type of the first communications service is higher than the priority of the type of the second communications service, sending a first authorization message to the first baseband communications processor and instructing the second baseband communications processor to stop performing the second communications service, wherein the first authorization message is used to authorize the first baseband communications processor to use the RF processor to perform the first communications service.

2. The method according to claim 1, wherein the resource request is sent from a physical layer of the first baseband communications processor.

3. The method according to claim 1, wherein the resource request is sent from a radio resource control (RRC) layer of the first baseband communications processor; and
   sending a first authorization message to the first baseband communications processor comprises:
   sending the first authorization message to a radio control and management (RCM) module, to enable the RCM module to send the first authorization message to the first baseband communications processor.

4. The method according to claim 1, wherein the comparing whether a priority of the type of the first communications service is higher than a priority of a type of the second communications service comprises:
   determining whether the second communications service is pre-emptible; and
   when the second communications service is pre-emptible, comparing whether the priority of the type of the first communications service is higher than the priority of the type of the second communications service.

5. The method according to claim 1, wherein the method further comprises:
   when the priority of the type of the first communications service is lower than or equal to the priority of the type of the second communications service, sending a resource request failure message to the first baseband communications processor, wherein the resource request failure message indicates that the first baseband communications processor is not authorized to use the RF processor to perform the first communications service.

6. The method according to claim 1, wherein after the sending a first authorization message to the first baseband communications processor and instructing the second baseband communications processor to stop performing the second communications service, the method further comprises:
   receiving a resource release indication message sent by the first baseband communications processor, wherein the resource release indication message indicates that the permission to use the RF processor has been released by the first baseband communications processor; and sending a second authorization message to the second baseband communications processor according to the resource release indication message, wherein the second authorization message is used to authorize the second baseband communications processor to continue to use the RF processor to perform the second communications service.

7. The method according to claim 1, wherein the resource request further comprises a preemption attribute of the first communications service, and the preemption attribute indicates whether the first communications service is pre-emptible.

8. The method according to claim 1, wherein the first SIM card supports at least one communications network standard, and the second SIM card supports at least one communications network standard.

9. A management apparatus for supporting multiple SIM cards to share an radio frequency (RF) processor, wherein the apparatus comprises the RF processor, a first baseband communications processor, a second baseband communications processor, and a manager, wherein the first baseband communications processor is configured to send a resource request to the manager when there is a first communications service that needs to be performed on a first SIM card, wherein the resource request is used to request, in response to the first communications service, a permission to use the RF processor, and the resource request comprises a type of the first communications service and a time period required for using the RF processor;

the second baseband communications processor is configured to implement a second communications service on a second SIM card;

the manager is configured to:

receive the resource request; determine whether the RF processor is authorized for the second baseband communications processor to perform the second communications service in at least a part of the time period;

when it is determined that the RF processor is authorized for the second baseband communications processor to perform the second communications service in at least a part of the time period, compare whether a priority of the type of the first communications service is higher than a priority of a type of the second communications service; and when the priority of the type of the first communications service is higher than the priority of the type of the second communications service, send a first authorization message to the first baseband communications processor, couple the first baseband communications processor to the RF processor, and instruct the second baseband communications processor to stop performing the second communications service, wherein the first authorization message is used to authorize the first baseband communications processor to use the RF processor to perform the first communications service; and the RF processor is configured to provide an RF communications link for the first communications service when the first baseband communications processor is authorized to use the RF processor.

10. The apparatus according to claim 9, wherein the first baseband communications processor comprises an RRC module and a physical layer management module, the resource request is sent by the physical layer management module, and the manager comprises an RCM module, wherein the RRC module is configured to: implement processing of a radio resource control communications protocol for the first SIM card, and send, to the physical layer management module when there is the first communications service on the first SIM card, a first notification message used to indicate that there is the first communications service on the first SIM card;

the physical layer management module is configured to: implement processing of a physical layer communications protocol for the first SIM card, receive the first notification message, and send the resource request to the RCM module; and the RCM module is configured to:

receive the resource request;

determine whether the RF processor is authorized for the second baseband communications processor to perform the second communications service in at least the part of the time period;

when it is determined that the RF processor is authorized for the second baseband communications processor to perform the second communications service in at least the part of the time period, compare whether the priority of the type of the first communications service is higher than the priority of the type of the second communications service; and when the priority of the type of the first communications service is higher than the priority of the type of the second communications service, send the first authorization message to the first baseband communications processor, couple the first baseband communications processor to the RF processor, and instruct the second baseband communications processor to stop performing the second communications service.

11. The apparatus according to claim 9, wherein the first baseband communications processor comprises an RRC module and a physical layer management module, the resource request is sent by the RRC module, and the manager comprises a radio resource management RRM module and an RCM module, wherein the RRC module is configured to:

implement processing of a radio resource control communications protocol for the first SIM card, and send the resource request to the RRM module when there is the first communications service on the first SIM card;

the physical layer management module is configured to implement processing of a physical layer communications protocol for the first SIM card;

the RRM module is configured to:

receive the resource request;

determine whether the RF processor is authorized for the second baseband communications processor to perform the second communications service in at least the part of the time period;

when the result of the determination is yes, compare whether the priority of the type of the first communications service is higher than the priority of the type of the second communications service; and when the priority of the type of the first communications service is higher than the priority of the type of the second communications service, send the first authorization message to the RCM module; and the RCM module is configured to:
receive the first authorization message sent by the RRM module,
send the first authorization message to the first baseband communications processor,
couple the first baseband communications processor to the RF processor, and
instruct the second baseband communications processor to stop performing the second communications service.

12. The apparatus according to claim 9, wherein a specific manner in which the manager compares whether the priority of the type of the first communications service is higher than the priority of the type of the second communications service is:
determining whether the second communications service is pre-emptible; and
when the second communications service is pre-emptible, comparing whether the priority of the type of the first communications service is higher than the priority of the type of the second communications service.

13. The apparatus according to claim 9, wherein the manager is further configured to send a resource request failure message to the first baseband communications processor when the priority of the type of the first communications service is lower than or equal to the priority of the type of the second communications service, wherein the resource request failure message indicates that the first baseband communications processor is not authorized to use the RF processor to perform the first communications service.

14. The apparatus according to claim 9, wherein the manager is further configured to: receive a resource release indication message sent by the first baseband communications processor, and send a second authorization message to the second baseband communications processor according to the resource release indication message, wherein the resource release indication message indicates that the permission to use the RF processor has been released by the first baseband communications processor, and the second authorization message is used to authorize the second baseband communications processor to continue to use the RF processor to perform the second communications service.

15. The apparatus according to claim 9, wherein the resource request further comprises a preemption attribute of the first communications service, and the preemption attribute indicates whether the first communications service is pre-emptible.

16. The apparatus according to claim 9, wherein the first SIM card supports at least one communications network standard, and the second SIM card supports at least one communications network standard.

* * * * *